US007325032B2

(12) United States Patent
Zuberec et al.

(10) Patent No.: US 7,325,032 B2
(45) Date of Patent: Jan. 29, 2008

(54) SYSTEM AND METHOD FOR PASSING CONTEXT-SENSITIVE INFORMATION FROM A FIRST APPLICATION TO A SECOND APPLICATION ON A MOBILE DEVICE

(75) Inventors: Sarah E. Zuberec, Seattle, WA (US); Andrew D. Padawer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 09/861,411

(22) Filed: May 18, 2001

(65) Prior Publication Data

US 2002/0116459 A1 Aug. 22, 2002

Related U.S. Application Data

(60) Provisional application No. 60/269,738, filed on Feb. 16, 2001.

(51) Int. Cl.
*G06F 15/16* (2006.01)
(52) U.S. Cl. ...................................... 709/204
(58) Field of Classification Search ........... 379/142.01, 379/200; 455/445; 709/249, 204, 224, 227–229; 715/501–810, 864, 738–739, 760; 705/30
See application file for complete search history.

(56) References Cited

U.S. PATENT DOCUMENTS

| 5,793,972 | A | * | 8/1998 | Shane ........................ 709/219 |
| 6,026,153 | A | * | 2/2000 | Fuller et al. ................. 379/200 |
| 6,181,344 | B1 | | 1/2001 | Tarpenning et al. ........ 345/358 |
| 6,314,469 | B1 | * | 11/2001 | Tan et al. ................... 709/245 |
| 6,389,124 | B1 | * | 5/2002 | Schnarel et al. ....... 379/142.01 |
| 6,405,221 | B1 | * | 6/2002 | Levine et al. ............ 715/501.1 |
| 6,453,164 | B1 | * | 9/2002 | Fuller et al. ................ 455/445 |
| 6,615,234 | B1 | * | 9/2003 | Adamske et al. ........... 709/203 |
| 6,622,128 | B1 | * | 9/2003 | Bedell et al. ................. 705/30 |
| 6,670,968 | B1 | * | 12/2003 | Schilit et al. ............... 715/760 |

(Continued)

OTHER PUBLICATIONS

Lucky, R., Experimental Telecommunications Services and Terminals, IEEE Journal, vol. 1, Issue 2, Feb. 1983, p. 309.*

*Primary Examiner*—Jason Cardone
*Assistant Examiner*—Thomas Duong
(74) *Attorney, Agent, or Firm*—Merchant & Gould P.C.; Ryan T. Grace

(57) ABSTRACT

Described is a system and method for passing context-sensitive information from a first application to another application on a mobile device (e.g., a cellular telephone). The method includes initiating the processing of a first application, such as receiving a cellular phone call that initiates a phone application residing on the mobile device. The first application provides a selection mechanism to allow a user to select a target application while continuing processing within the first application. The selection mechanism may include a smart link that appears as text on the display. In one embodiment, the text may have an abbreviated name for the target application. In addition, the text for the smart link may change based on the application type of the first application or based on the context of the first application. For example, if the first application is a phone application on a mobile device, the smart links may display text for a note application, a task application, a contact application, a calendar application, and a billing application.

26 Claims, 5 Drawing Sheets

U.S. PATENT DOCUMENTS

| | | | |
|---|---|---|---|
| 6,674,453 B1 * | 1/2004 | Schilit et al. | 715/810 |
| 6,697,842 B1 * | 2/2004 | Smith et al. | 709/206 |
| 7,007,239 B1 * | 2/2006 | Hawkins et al. | 715/780 |
| 2001/0025320 A1 * | 9/2001 | Seng et al. | 709/245 |
| 2002/0065941 A1 * | 5/2002 | Kaan et al. | 709/249 |

* cited by examiner

SYSTEM AND METHOD FOR PASSING CONTEXT-SENSITIVE INFORMATION FROM A FIRST APPLICATION TO A SECOND APPLICATION ON A MOBILE DEVICE

RELATED APPLICATIONS

This application claims the benefit under 35 U.S.C. § 119(e) of U.S. provisional patent Application No. 60/269,738, filed Feb. 16, 2001.

TECHNICAL FIELD

The present invention relates to computing devices, and, more specifically, to navigating among applications residing on a mobile computing device.

BACKGROUND OF THE INVENTION

Manufacturers are continually adding additional applications to computing devices, such as mobile telephones, in order to meet an increasing demand for a multi-functional device. For example, mobile telephones are increasingly becoming more than just wireless voice communication devices. Rather, in addition to handling voice data, some mobile telephones have a display unit to display graphical data to support email, web browser, and other non-voice features. One of the problems associated with providing this multi-functional capability on a small computing device is the inability to display necessary and useful information on the small display unit. In addition, the small size of the device makes it cumbersome for the user to enter information. Another problem is the difficulty in navigating among the additional applications using the small display units and limited hardware buttons that could be used as accelerators. Typically, navigation is performed by selecting a "home" or top-level display and then drilling down to the selected application. However, as the number of applications increase, this navigation technique increases the amount of user interaction required to get to the desired application and makes it inconvenient for a user to switch quickly between applications. The amount of user interaction required for this navigation technique is especially cumbersome when a user is actively within one of the applications, such as being in a call on a mobile telephone.

SUMMARY OF THE INVENTION

Briefly described, the present invention addresses the above-described needs by providing a system and method for passing context-sensitive information from a first application to another application on a mobile device (e.g., a cellular telephone). The method includes initiating the processing of a first application, such as receiving a cellular phone call that initiates a phone application residing on the mobile device. The first application provides a selection mechanism to allow a user to select a target application while continuing processing within the first application. The selection mechanism may include a smart link that appears as text or an icon on the display. In one embodiment, the link may have an abbreviated name for the target application. In addition, the text for the smart link may change based on the application type of the first application. For example, if the first application is a phone application on a mobile device, the smart links may display text for a note application, a task application, a contact application, a calendar application, and a billing application. Moreover, the smart link itself may change within the same application based on the state of the mobile device. For example, a smart link may be provided to launch a contact manager and either open an existing contact for the calling party, or create a new contact for the calling party based on whether the contact already exists.

In operation, a user selects one of the smart links displayed on the screen. The smart link determines relevant data for the desired application based on information available to the first application. In one embodiment, the smart link may pass the relevant data to the desired application using a pointer. Once the desired application receives the relevant data, the desired application begins processing. For example, if the first application is the phone application, available information to the phone application may include a caller's phone number, a caller's name, a current time, a current date, and a current duration of the call. Thus, if the user selects the smart link associated with a contact application, the smart link may pass the caller's phone number and the caller's name as the relevant data. Once the desired application receives the relevant data, the desired application may begin using the relevant data without further intervention by the user. For example, the contact application may use the caller's phone number and name to search its contact list for a corresponding entry. If the corresponding entry is found, the contact application may display the corresponding entry on the display. If the corresponding entry is not found, the contact application may create a new contact entry using the relevant data. As one can appreciate, navigating to the desired application using smart links in accordance with the present invention provides additional benefits over traditional navigation links. For example, not only may a new interface appear on the display, but in addition, the desired application may begin processing information obtained from the first application without additional user interaction.

The advantages of the navigation technique provided in accordance with the present invention may be utilized in several scenarios. For example, if a user (i.e., an attorney) receives a cellular phone call, the phone application will begin executing and corresponding smart links will appear on the display. The attorney may then select the smart link associated with a billing application to begin billing the caller's account. For this scenario, the smart link may pass the caller's phone number, the caller's name, the current time, and the current date as the relevant information. Thus, the attorney has successfully "navigated" to another application without undue user-interaction and has also initiated processing of another application using information from the first application.

DETAILED DESCRIPTION OF THE PREFERRED EMBODIMENT

Illustrative Mobile Computing Device Implementing the Present Invention

Figure 1:
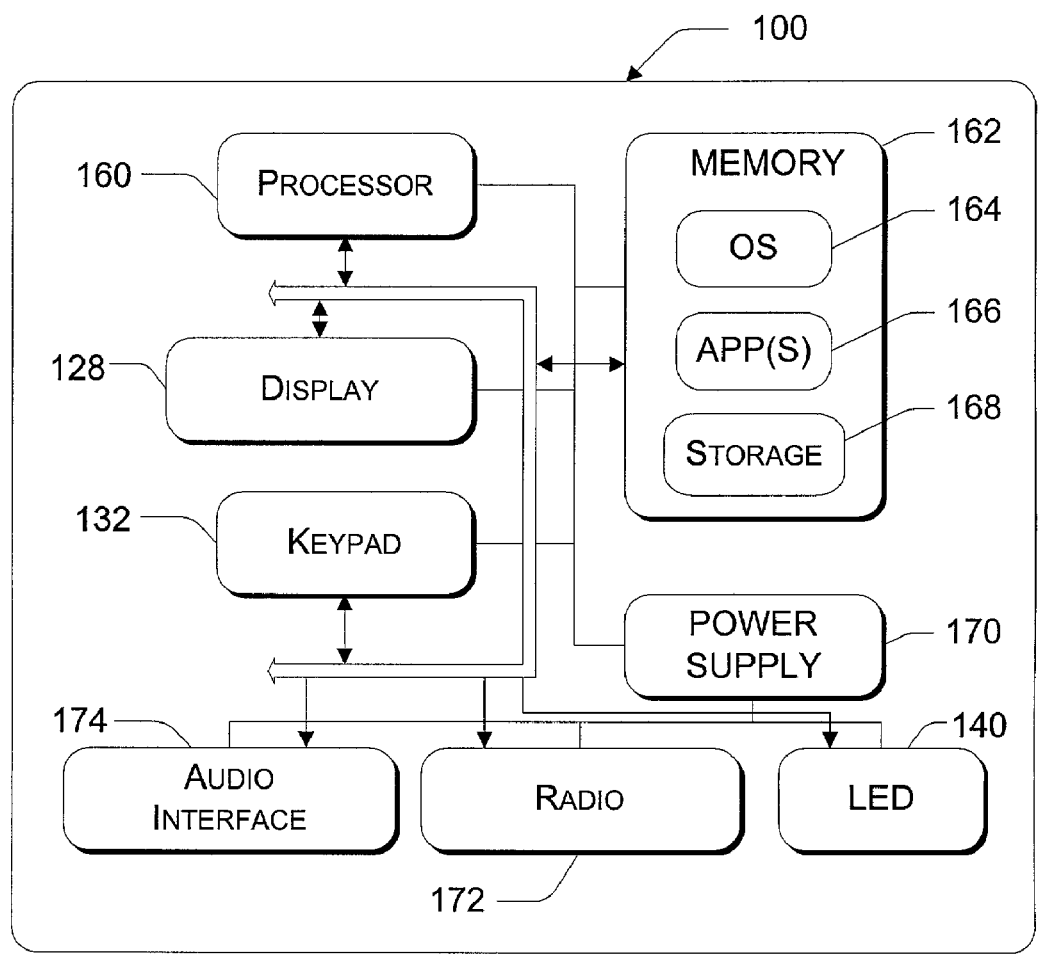
FIG. 1 is a functional block diagram illustrating functional components of an exemplary mobile electronic device.

FIG. 1 is a functional block diagram illustrating functional components of a sample mobile device 100 adapted for use in one implementation of the present invention. The mobile device 100 has a processor 160, a memory 162, a display 128, and a keypad 132. The memory 162 generally includes both volatile memory (e.g., RAM) and non-volatile memory (e.g., ROM, Flash Memory, or the like). The mobile device 100 includes an operating system 164, such as the Windows CE operating system from Microsoft Corporation or other such operating system, which is resident in the memory 162 and executes on the processor 160. The keypad 132 may be a push button numeric dialing pad (such as on a typical telephone), a multi-key keyboard (such as a conventional keyboard). The display 128 may be a liquid crystal display, or any other type of display commonly used in mobile computing devices. The display 128 may be touch-sensitive, and would then also act as an input device.

One or more application programs 166 are loaded into memory 162 and run on the operating system 164. Examples of application programs include phone dialer programs, email programs, scheduling programs, PIM (personal information management) programs, word processing programs, spreadsheet programs, Internet browser programs, and so forth. The mobile device 100 also includes non-volatile storage 168 within the memory 162. The non-volatile storage 168 may be used to store persistent information which should not be lost if the mobile device 100 is powered down. The applications 166 may use and store information in the storage 168, such as e-mail or other messages used by an e-mail application, contact information used by a PIM, appointment information used by a scheduling program, documents used by a word processing application, and the like. A synchronization application also resides on the mobile device and is programmed to interact with a corresponding synchronization application resident on a host computer to keep the information stored in the storage 168 synchronized with corresponding information stored at the host computer.

The mobile device 100 has a power supply 170, which may be implemented as one or more batteries. The power supply 170 might further include an external power source, such as an AC adapter or a powered docking cradle that supplements or recharges the batteries.

The mobile device 100 is also shown with two types of external notification mechanisms: an LED 140 and an audio interface 174. These devices may be directly coupled to the power supply 170 so that when activated, they remain on for a duration dictated by the notification mechanism even though the processor 160 and other components might shut down to conserve battery power. The LED 140 may be programmed to remain on indefinitely until the user takes action to indicate the powered-on status of the device. The audio interface 174 is used to provide audible signals to and receive audible signals from the user. For example, the audio interface 174 may be coupled to a speaker for providing audible output and to a microphone for receiving audible input, such as to facilitate a telephone conversation.

The mobile device 100 also includes a radio 172 that performs the function of transmitting and receiving radio frequency communications. The radio 172 facilitates wireless connectivity between the mobile device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the mobile device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
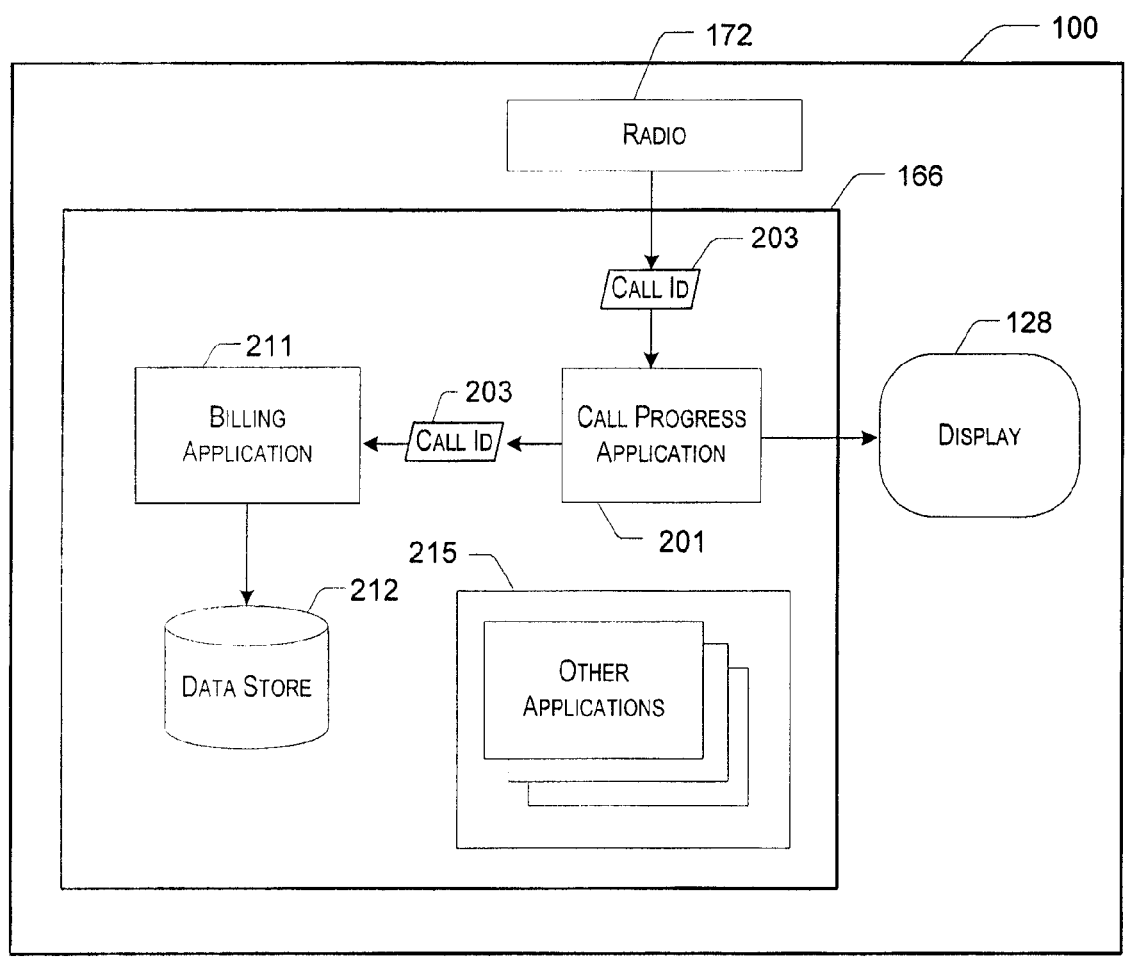
FIG. 2 is a functional block diagram of illustrative software components on the mobile device 100 that implement the present invention.

FIG. 2 is a functional block diagram of illustrative software components on the mobile device 100 that implement the present invention. This implementation of the invention is described in the general context of computer-executable instructions or components, such as software modules, being executed on a mobile computing device. Generally, program modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

With reference to FIG. 2, when a call is connected, whether incoming or outgoing, the radio 172 initiates the communication with call connection software, such as a call handling application (not shown) executing on the mobile device 100. Typically, call identification information (call ID) 203 is included with the communication data for the call. Typically, the call ID 203 includes at least the calling phone number of the current call. The call ID 203 may additionally include the name of the calling party, although generally wireless communications do not include the name.

When received from the radio 172, the call handling application passes the call ID info 203 to a call progress application 201, which is an application responsible for maintaining a user interface on the display 128. The call progress user interface is illustrated in detail in FIG. 3 and described below. Briefly described, the call progress application 201 displays the call ID 203 in conjunction with other call-related information, such as the duration of the call. Typically, the call progress application may resolve the calling phone number into an associated name by querying a contacts database (not shown) to determine if any stored contacts include the calling phone number. If so, the associated name from the contact information may be displayed in lieu of the calling number.

For the purpose of the following discussion, all information related to the current call (e.g., call ID, call-related information and the like) will be referred to as the context of the call program application. Thus, in addition to the context being display as described above, the call progress application 201 displays a list of context-sensitive links to other applications that may be of interest to the user during the call. For example, while the user is in a call, there may be displayed a link to another application, such as a billing application 211. By activating the link (as described later), the user causes the call progress application 201 to launch the application associated with the link and to pass context-sensitive information to the launched application. For example, if the user activates a link to the billing application 211, the call progress application 201 may invoke the billing application 211 and pass to it the call ID 203 for the call in progress. Based on the call ID 203, the billing application 211 may retrieve from a data store 212 client billing information specific to the calling party. The billing application may even present a new user interface with new links or menu items related to the billing application 211.

The user interface presented by the call progress application 201 may include links to any number of other context-relevant applications 215, such as a contacts manager, a calendar application, a notes application, a task list, or any other application. Moreover, the links may be used to create new data, such as a new task, note, or appointment, or they may allow the user to access existing data, such as viewing the calendar or a contact associated with the current calling party. Importantly, the links do not just take the user to an alternate application, rather they provide relevant information to the target application based on the context of the first application. For example, if the identity of the calling party is already known, a link to a contacts manager takes the user to the particular contact for the calling party. A link to the notes application could paste the calling party's name and number into a new note. A link to a task list could paste the information into the new task, or call up a view of all tasks related to the calling party.

In one embodiment, if a link is activated but only the calling number is available in the call ID 203, the call progress application 201 may pass only the number to the linked application. Alternatively, if the calling party's name is available (either directly from the call ID 203 or by looking it up from stored contact data), the name may be passed to the linked application. In addition, parameters may be passed with the call ID 203 to the linked application to define how the linked application should act on the call ID information. In other words, if the linked application is an e-mail program, the call progress application 201 may pass the call ID 203 with instructions to address an e-mail message to the calling party. Additional call-related information may be included as well, such as the time of the call, the duration of the call, whether inbound or outbound, and the like.

Figure 3:
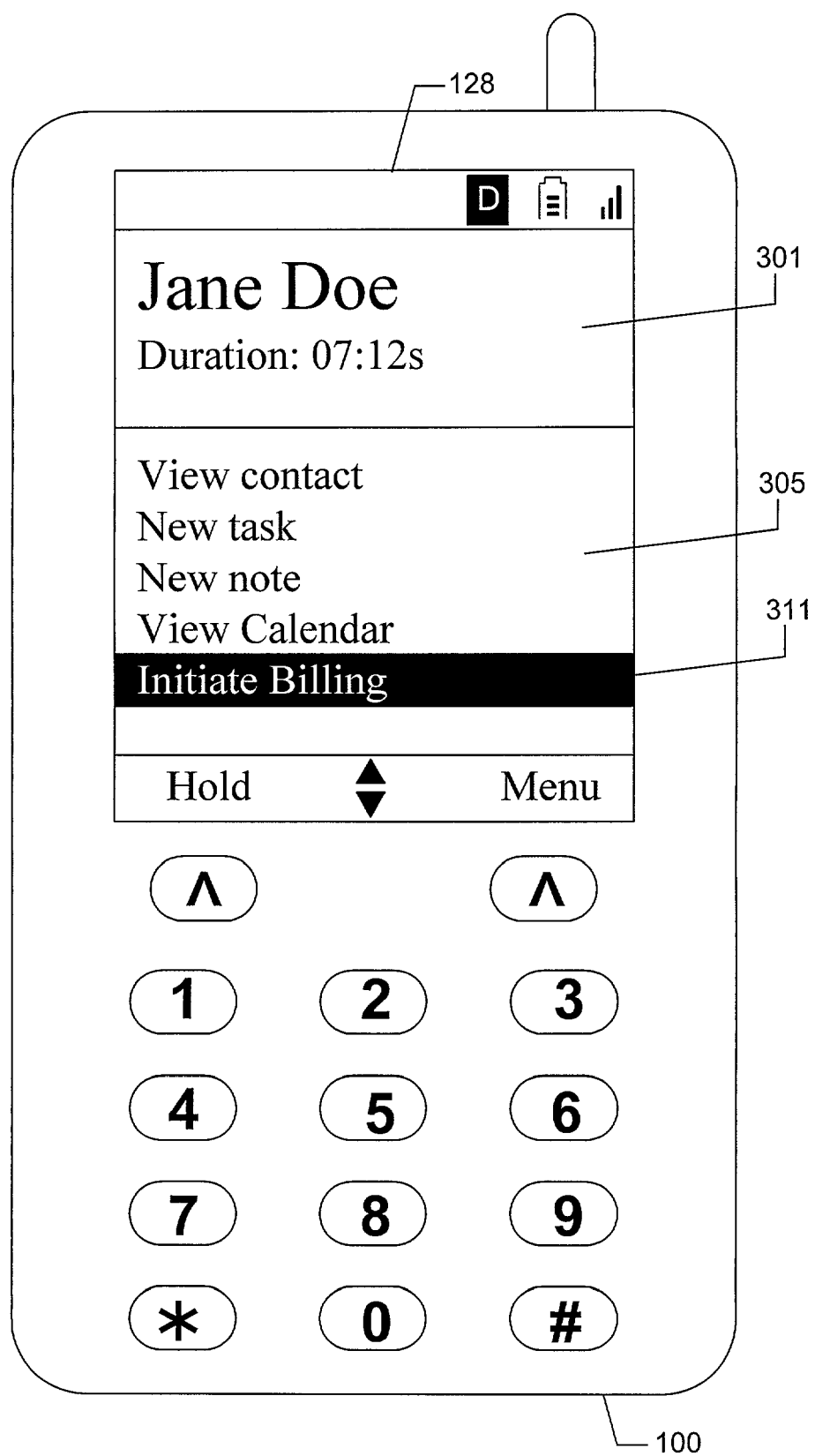
FIG. 3 is a diagram illustrating an exemplary user interface display.

FIG. 3 is an illustrative display 128 showing a sample user interface that may be presented by the call progress application 201 described above. The display 128 includes context 301 of the call progress application, such as the name of the calling party and the duration of the call, based on the call ID 203. In addition, a listing of links 305 is displayed to applications that may be of interest to the user while the user is in the current call. For example, the sample links 305 include a link to a contact application, a task list, a note application, a calendar application, and a billing application 311. The billing application link 311 is currently highlighted. If the billing application link 311 is selected, the call progress application 201 invokes the billing application 211 (shown in FIG. 2) and passes at least a portion of the context 301 of the call progress application, such as the call ID 203 and possibly the additional call-related information. The result may be a new user interface presented by the billing application 211, such as the one illustrated in FIG. 4.

Figure 4:
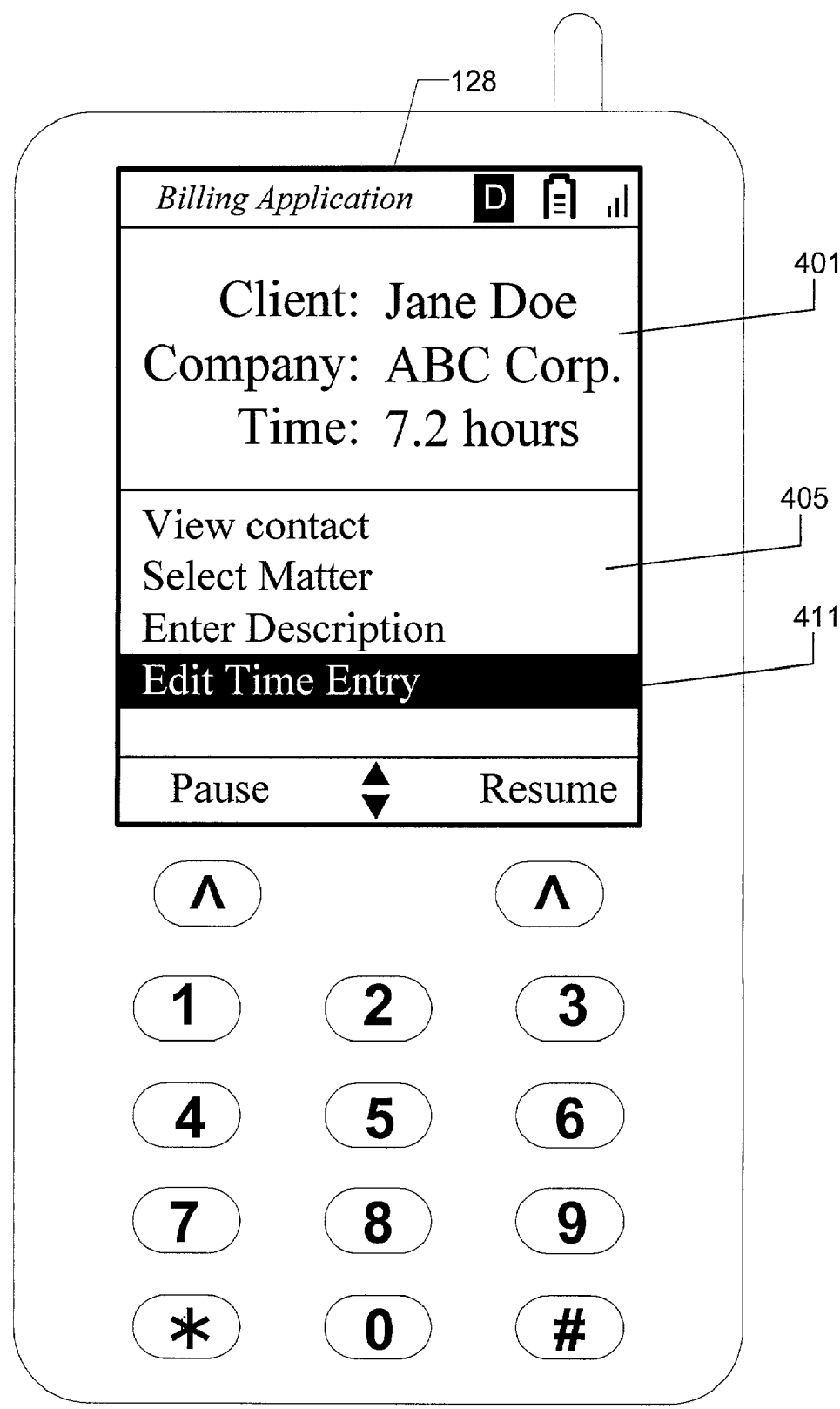
FIG. 4 is a diagram illustrating another exemplary user interface display.

FIG. 4 is another illustrative display 128 showing a user interface that may be presented by the billing application 211 after having been invoked with context-sensitive information using the links shown in the illustrative user interface of FIG. 3. As can be seen from FIG. 4, by having the call ID 203 and call-related information passed to it, the billing application 211 is able to initiate a billing entry specifically for the calling party. In other words, when the user receives a call from an individual identifiable by the call ID 203, that information may be passed directly to the billing application 211 and a billing entry initiated when the user activates a single menu selection (i.e., activating the appropriate billing application link 311). The user interface presented by the billing application 211 includes the call-related information 401, and may additionally include a new listing 405 of context-sensitive links or menu items. For instance, in this example, the user may select an "edit time entry" option 411 to edit the particular billing entry that has been initiated. As can be seen from the preceding examples and illustrations, the present invention takes advantage of the integration of cellular phones and mobile computing devices or PDAs by seamlessly passing context-sensitive information between the phone application (e.g., the call progress application) and other applications, thus making the user's stored data a more powerful tool.

Figure 5:
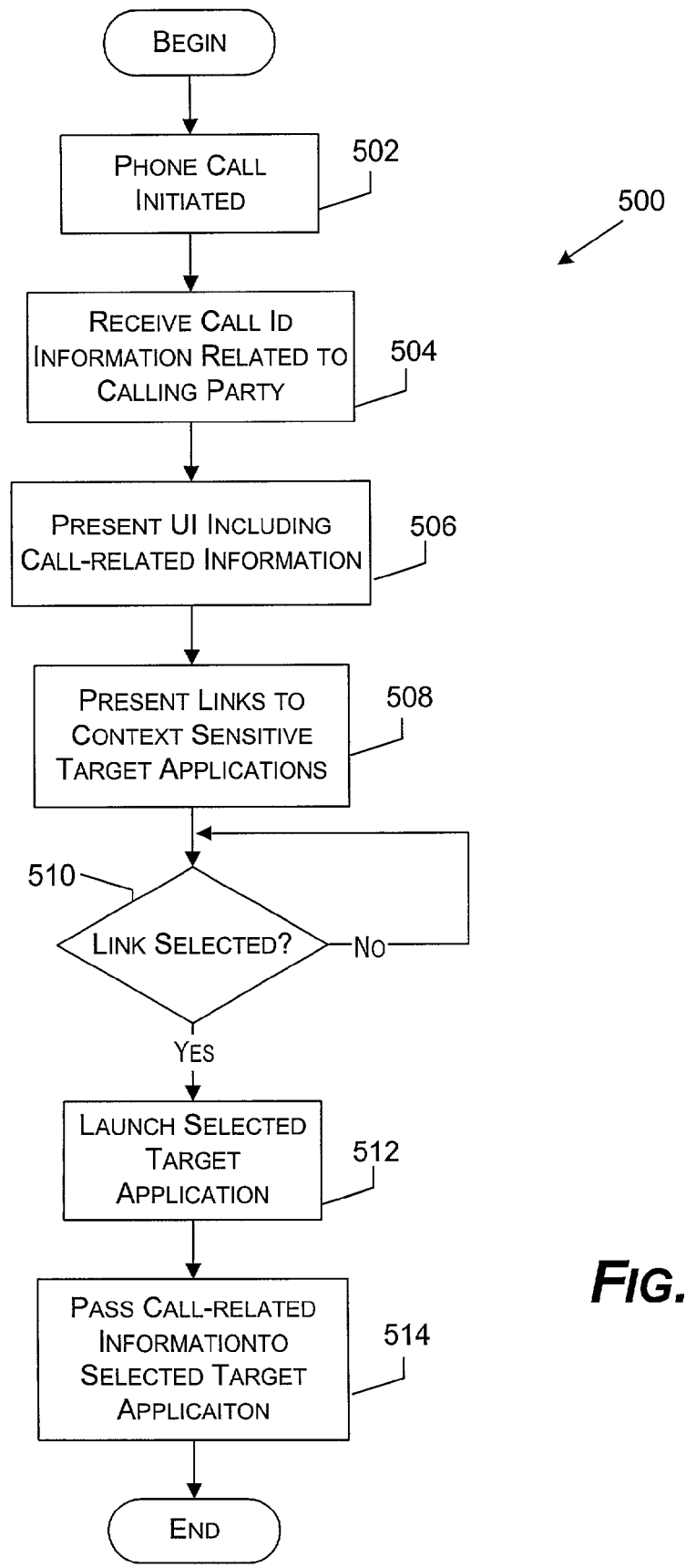
FIG. 5 is a logical flow diagram generally summarizing a process performed by the system illustrated in FIGS. 1-4 to invoke a second application while a first application is executing, and to pass to the second application context-sensitive information about the execution of the first application, in accordance with one implementation of the present invention.

FIG. 5 is a logical flow diagram generally summarizing a process 500 performed by the system described above to invoke a target application while a first application is executing, and to pass to the target application context-sensitive information about the execution of the first application. The process 500 begins at block 502, where a phone call is initiated at a mobile device. The phone call may be either inbound or outbound. As is known in the art, the data transmitted during a phone call typically includes both voice data and metadata describing the phone call, such as the calling party's phone number and possibly the calling party's name.

At block 504, the metadata (call ID data) describing the current phone call is received at a first application, such as a call progress application responsible for presenting a user interface on the mobile device. At block 506, the user interface is presented including context of the first application, such as the metadata and any other call-related information. For example, the user interface may display the calling phone number together with the duration of the call. Other information may additionally, be displayed, such as the name of the calling party if that information is either included with the metadata or is discoverable from other information stored on the mobile data.

At block 508, a list of links to target applications is presented on the user interface. In this implementation, the user interface may be tailored to present a list of links in context, meaning that the list of links may be different depending on what application is in control of the mobile device or the user interface. If the application in control of the mobile device is a call progress application, the list of links may include links to an e-mail application, a contact manager, other PIM-related applications, a calendar application, billing software, and the like.

At block 510, the user interface awaits a selection of one of the links by the user. The user interface may be continuously updated with call-related information during this time, such as the call duration and the like. Eventually, if a link is selected, the process 500 continues to block 512.

At block 512, the target application pointed to by the selected link is invoked or launched, and, at block 514, the call-related information, including the call metadata, is passed to the target application. The information passed may be as simple as only the calling party's phone number or name, or it may be as comprehensive as both the number and name, the call duration, the time the call was initiated, whether inbound or outbound, additional contact-related information if available, and the like. Based on the information passed, the target application may take over the user interface or the mobile device and resume processing. Thus completes the process 500.

While the above description focuses on navigating among applications on small computing devices, the present invention is also applicable to other computing devices, such as laptops, PCs and such. Even though these types of computing devices typically have larger displays, the convenience of easily navigating to a desired application while still using the first application is applicable. For example, if an attorney receives a teleconferencing call from a client over a personal computer (e.g., using the Microsoft NetMeeting teleconferencing software, or the like), the attorney may conveniently select a smart link associated with a billing application. Once the billing application receives the relevant data, it begins the billing process while the attorney remains talking with the client through the teleconferencing application.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for navigating among applications of a mobile computing device, comprising:
   providing a mobile computing device having a telephone component and a computing component;
   initiating processing, on the telephone component, of a telephone application having an associated context;
   determining a dynamic list of target applications, associated with the computing component, wherein the determination of the dynamic list of target applications is based on the associated context of the telephone application;
   providing the dynamic list of target applications for selecting a target application while processing the telephone application;
   if the target application is selected,
      invoking the target application;
      determining telephone application data to pass to the target application based on the context of the target application;
      passing the determined telephone application data to the target application;
   performing processing within the target application while continuing processing in the telephone application; and
   updating the dynamic list of target applications, wherein the updated dynamic list of target applications is associated with the context of the selected target application.

2. The computer-implemented method of claim 1, wherein the dynamic list includes a link appearing on a touch-sensitive display.

3. The computer-implemented method of claim 1, wherein the dynamic list includes a link appearing on a display that is selectable using a button on the mobile computing device.

4. The computer-implemented method of claim 1, wherein the dynamic list includes a menu entry within a menu on a display.

5. The computer-implemented method of claim 1, wherein the dynamic list includes a button that is selectable.

6. The computer-implemented method of claim 1, wherein the context includes metadata transmitted during a phone call and the telephone application data includes at least a portion of the metadata.

7. The computer-implemented method of claim 6, wherein the telephone application data further includes additional information for the target application.

8. The computer-implemented method of claim 1, wherein the processing of the target application depends on the telephone application data received by the target application.

9. The computer-implemented method of claim 8, wherein the target application includes a contact manager and processing of the target application includes opening an existing contact.

10. The computer-implemented method of claim 8, wherein the target application includes a contact manager and processing of the target application includes creating a new contact.

11. The computer-implemented method of claim 1, wherein the target application includes one of a contact application, a task list, a note application, a calendar application and a billing application.

12. The computer-implemented method of claim 1, wherein passing the telephone application data includes passing a pointer referencing the information to the target application.

13. A computer-readable storage medium storing computer-executable components, comprising:
   a telephone component for receiving telephone metadata;
   a personal digital assistant component for receiving at least a portion of the telephone metadata from telephone component, determining a list of personal digital assistant applications based on the telephone metadata, displaying at least one link on the display for selecting at least one personal digital assistant application from the list of personal digital assistant applications, and if one of the links is selected, for invoking a personal digital assistant application associated with the selected link, determining at least a portion of the telephone metadata to provide the personal digital assistant application, and updating the at least one link to associate the at least one link with the personal digital assistant application,
   wherein the telephone and personal digital assistant components continue operations while the personal digital assistant application is processing.

14. The computer-readable storage medium of claim 13, wherein the plurality of computer-executable components further includes another personal digital assistant application associated with the invoked personal digital assistant application for displaying data generated by the personal digital assistant application on the display.

15. The computer-readable storage medium of claim 13, wherein the telephone metadata includes a phone number.

16. The computer-readable storage medium of claim 15, wherein the telephone metadata further includes a name associated with the phone number.

17. The computer-readable storage medium of claim 13, wherein the personal digital assistant component is configured for providing additional information to the personal digital assistant application.

18. The computer-readable storage medium of claim 17, wherein the additional information influences the processing of the personal digital assistant application.

19. A mobile computing device, the device comprising:
a processor;
a display;
a memory into which a plurality of computer-executable components are loaded, the computer-executable components providing navigation among one or more target applications when executed by the processor, rite plurality of computer-executable components including:
a telephone component for receiving telephone metadata;
a personal digital assistant component for receiving at least a portion of the telephone metadata from the telephone component, determining a list of personal digital assistant based on the telephone metadata, displaying at least one link on the display for selecting at least one personal digital assistant application from the list of personal digital assistant applications, and if one of the links is selected, for invoking a personal digital assistant application associated with the selected link, determining at least a portion of the telephone metadata to provide the personal digital assistant application, and updating the at least one link to associate the at least one link with the personal digital assistant application,
wherein the telephone and personal digital assistant components continue operations while the personal digital assistant application is processing.

20. The mobile computing device of claim 19, wherein the telephone metadata includes a phone number.

21. The mobile computing device of claim 20, wherein the telephone metadata further includes a name associated with the phone number.

22. The mobile computing device of claim 19, wherein the telephone application includes a call progress application and the telephone metadata includes a phone number associated with a phone call in progress.

23. The mobile computing device of claim 19, wherein the plurality of computer-executable components further includes another personal digital assistant application associated with the invoked personal digital assistant application for displaying data generated by the personal digital assistant application on the display.

24. In a computing device having a graphical user interface including a display, a user interface selection mechanism, a telephone component, and a personal digital assistant component, a method of providing and selecting a link on the display, the method comprising:
determining a dynamic list of applications associated with the personal digital assistant component and based on an associated context of a telephone application;
displaying one or more links to personal digital assistant applications on the display based on data associated with the telephone application, each link linking the telephone application to the personal digital assistant applications;
receiving a link selection signal through the user interface selection mechanism in response to the link selection signal, invoking the personal digital assistant application associated with the link selection signal, determining telephone application data to pass to the selected personal digital assistant application based on a context of the personal digital assistant application, and passing the determined telephone application data from the telephone application to the personal digital assistant application associated with the selection signal, the personal digital assistant application performing processing with the determined telephone application data while the telephone application remains operational; and
updating the display of links to include links associated with the selected personal digital assistant application.

25. The method of claim 24, further comprising displaying personal digital assistant information generated by the personal digital assistant application on the display.

26. The method of claim 24, wherein the one or more links displayed for the telephone application differs from the one or more links associated with the selected personal digital assistant application.

* * * * *

UNITED STATES PATENT AND TRADEMARK OFFICE
CERTIFICATE OF CORRECTION

| | | |
|---|---|---|
| PATENT NO. | : 7,325,032 B2 | Page 1 of 1 |
| APPLICATION NO. | : 09/861411 | |
| DATED | : January 29, 2008 | |
| INVENTOR(S) | : Sarah E. Zuberec et al. | |

It is certified that error appears in the above-identified patent and that said Letters Patent is hereby corrected as shown below:

In column 8, line 37, in Claim 13, after "from" insert -- the --.

In column 9, line 10, in Claim 19, delete "rite" and insert -- the --, therefor.

Signed and Sealed this

Twenty-sixth Day of April, 2011

David J. Kappos
*Director of the United States Patent and Trademark Office*